United States Patent
Benton et al.

(10) Patent No.: US 7,273,832 B2
(45) Date of Patent: Sep. 25, 2007

(54) ALKALI METAL TUNGSTATE COMPOSITIONS AND USES THEREOF

(75) Inventors: William J. Benton, Magnolia, TX (US); Neal F. Magri, Katy, TX (US)

(73) Assignee: Cabot Corporation, Boston, MA (US)

( * ) Notice: Subject to any disclaimer, the term of this patent is extended or adjusted under 35 U.S.C. 154(b) by 684 days.

(21) Appl. No.: 10/216,048

(22) Filed: Aug. 9, 2002

(65) Prior Publication Data

US 2003/0114318 A1    Jun. 19, 2003

Related U.S. Application Data

(60) Provisional application No. 60/311,729, filed on Aug. 10, 2001.

(51) Int. Cl.
*C09K 8/528* (2006.01)
*C09K 8/04* (2006.01)
*C09K 8/06* (2006.01)

(52) U.S. Cl. ............... 507/269; 507/140; 507/145; 507/277; 507/241; 507/260; 507/235; 507/236; 507/925; 507/131; 166/311; 166/312

(58) Field of Classification Search ........... 166/311, 166/312; 507/269, 276, 277, 241, 260, 235, 507/236, 140, 141, 925, 131
See application file for complete search history.

(56) References Cited

U.S. PATENT DOCUMENTS

| | | | | |
|---|---|---|---|---|
| 2,452,021 A * | 10/1948 | Wayne | ................ | 507/145 |
| 2,573,959 A * | 11/1951 | Fischer | ................ | 507/137 |
| 3,617,576 A * | 11/1971 | Kerst | ................ | 210/699 |
| 3,720,525 A * | 3/1973 | Feldstein | ................ | 106/1.26 |
| 4,083,922 A | 4/1978 | Kasserra | ................ | 423/56 |
| 4,409,121 A | 10/1983 | Latos et al. | ................ | 252/389 |
| 4,413,680 A | 11/1983 | Sandiford et al. | ................ | 166/270 |
| 4,540,882 A * | 9/1985 | Vinegar et al. | ................ | 250/255 |
| 4,693,979 A * | 9/1987 | Stetter et al. | ................ | 435/199 |
| 4,783,492 A | 11/1988 | Dovan et al. | ................ | 523/130 |
| 5,282,995 A | 2/1994 | Paul et al. | ................ | 252/80 |
| 5,360,550 A * | 11/1994 | Clubley et al. | ................ | 210/699 |
| 5,614,003 A * | 3/1997 | Mallory, Jr. | ................ | 106/1.22 |
| 5,616,278 A * | 4/1997 | Carey et al. | ................ | 252/180 |
| 5,629,838 A * | 5/1997 | Knight et al. | ................ | 361/782 |
| 5,904,734 A * | 5/1999 | Friberg et al. | ................ | 8/111 |
| 6,354,358 B1 * | 3/2002 | Ishida | ................ | 164/72 |

FOREIGN PATENT DOCUMENTS

| | | | |
|---|---|---|---|
| CH | 610354 A * | 4/1979 | |
| EP | 1 178 099 | 2/2002 | |
| GB | 2 314 865 | 1/1998 | |
| WO | WO96 31435 | 10/1996 | |
| WO | WO 02 06422 | 1/2002 | |

* cited by examiner

*Primary Examiner*—Philip C. Tucker

(57) ABSTRACT

Fluids, such as completion fluids, containing at least one alkali metal tungstate and optionally at least one chelating agent are described. Methods of removing a filter cake from a well bore surface, which may include one or more alkaline earth metal sulfates, is also described, wherein the method includes contacting the filter cake with the completion fluid of the present invention. A drilling fluid or mud is also described wherein the drilling fluid contains at least one alkali metal tungstate. The drilling fluid preferably further contains at least one emulsifier or surfactant and at least one hydrocarbon-based fluid. The various fluids of the present invention can contain other conventional ingredients and optionally at least one alkali metal formate. The present invention permits the fluids to be essentially solids free due to the use of the alkali metal tungstate.

114 Claims, No Drawings

ALKALI METAL TUNGSTATE COMPOSITIONS AND USES THEREOF

This application claims the benefit under 35 U.S.C. §119 (e) of prior U.S. Provisional Patent Application No. 60/311,729 filed Aug. 10, 2001, which is incorporated in its entirety by reference herein.

BACKGROUND OF THE INVENTION

The present invention relates to various compositions containing alkali metal tungstates and uses of these compositions in a variety of applications. In particular, the present invention relates to the control of scaling deposits, such as alkaline earth metal sulfates, on a surface and compositions which have the capability of controlling alkaline earth metal sulfates on surfaces, and in porous media. The present invention also relates to the drilling industry and more particularly relates to the completion fluids used in the completion of a well for the recovery of hydrocarbons or other materials. Further, the present invention relates to drilling fluids used in drilling, such as the drilling of a well for the recovery of hydrocarbons or other materials.

In drilling operations, such as the drilling that occurs in oil field operations, drilling fluids are designed/formulated to serve several functions. These functions include acting as a lubricant to the drill bit to reduce wear and friction during drilling and also to seal the formation surface by forming a filter cake. Currently, in the industry, both oil-based muds (OBMs) and water based muds (WBMs) are typically used. More commonly, synthetic based muds (SBMs) are also used in drilling operations. In the drilling fluid, agents for lubrication will be present as well as weighting materials in order to achieve a density that is typically greater than the surrounding pressure in the well bore. Furthermore, the drilling fluid will also contain a sealing or fluid loss agent, such as calcium carbonate and polymers, in order to form the filter cake on the formation surface of the well bore. In addition, when the drilling fluids are used during drilling, the drilling fluid will also contain drilling fines, such as shale and sandstone fines. During the drilling operations and afterwards, the filter cake seals the formation surface of the well bore so that the well bore can be completely formed without any leakage from the formation surface into the well bore and/or without any leakage of the drilling fluids into the formation surface. While the filter cake is beneficial for these reasons, once the drilling is completed, and the recovery of hydrocarbons is the next step, the filter cake can act as a severe impediment to the recovery of hydrocarbons. For instance, the filter cake can prevent the recovery of hydrocarbons from the formation surfaces which have been blocked or sealed by the filter cake. Furthermore, when injectors are used to retain reservoir pressures, the injection of sea water, for instance, can be significantly reduced due to the filter cake preventing the sea water from entering the formation and hence enhancing recovery of hydrocarbons. This invention refers to wells that are drilled to either recover hydrocarbons or injectors wells used for pressure retention in a reservoir which will use either sea water, produced water, or waste water injection such as in disposal wells. In all these cases, it is useful to retain optimum injection or production rates by first removing all remnants of the filter cake first used to drill the well. Accordingly, the industry prefers to remove the filter cake from the well bore in order to optimize productivity. If the filter cake is not removed, the filter cake can block the pores that are part of the formation surface of the well bore which will interfere with the recovery of hydrocarbons. The removal of the filter cake can be even a more difficult problem when the drilling fluid contains barite as the weighting material. Typically, in many drilling operations, the drilling fluid can contain up to 50% by weight of a weighting material such as barite. Barite, also known as barium sulfate, and other alkaline earth metal sulfates are not easily dissolved and are not easily suspended in liquids. Thus, the removal of barite or other alkaline earth metal sulfates that may be present in drilling fluids can be a significant problem.

Once drilling operations have been completed, the well is prepared for the completion operations whereby the mud used for drilling is often displaced by a completion fluid. Completion fluids are typically water based clear fluids and are formulated to the same density as the mud used to drill the well in order to retain the hydraulic pressure on the well bore. There are numerous methods of completing a well, amongst which are open hole completions, pre-drilled, liner, and gravel packed screened systems. The clear fluids are typically halide based brines or organic based brines such as the formate based fluids. While the completion fluid displaces the drilling fluid, the filter cake is still in place and accordingly, there is a need to provide better technology to overcome the above-described problems and preferably to provide technology which can successfully remove the filter cake from the formation surface of the well bore, including any alkaline earth metal sulfates that may be present as part of the drilling fluid and at the same time retain density in the well bore. Alkaline earth metal sulfates, such as barium sulfate (also known as barite) are scales frequently seen in oil field operations, most often occurring due to temperature drops occurring in production or the mixing of incompatible waters from sea water injection. Barium sulfate, unlike carbonate scales, tends to form quickly once saturation conditions are reached and does not readily dissolve in currently available solvents.

The alkaline earth metal sulfates generally form as scales on the surfaces of well bores, perforation tunnels, near well bore regions, the tubing in a well, and other surfaces and eventually can build up to a point where the amount of hydrocarbons being produced from the well is significantly reduced. In the past, a well would have to be shut down in order for the barium sulfate and other alkaline earth metal sulfates to be removed by mechanical and/or chemical treatments. For instance, a mechanical scrubber could be inserted into the well to remove the scaling or chemicals, such as solvents, could be used to remove the scaling. When barium sulfate occurs within a formation, there is no current truly effective treatment for removal. Stimulation of the well is attained by dissolving the rock around the barite. The current technology available for controlling alkaline earth metal sulfate buildup in wells and other surfaces has thus far proved not to be economical due to slow dissolution rates resulting in extended shut in and the need to shut the well in and/or the inability of the current technology to adequately remove a sufficient degree of the alkaline earth metal buildup.

In drilling an oil or gas well, the use of hydrocarbon-based drilling fluids are greatly preferred because of the inherent advantages of having an external phase fluid in contact with the formation. However, one severe disadvantage to a hydrocarbon-based drilling fluid is that weighting materials, such as barite, calcium carbonate, or hematite must be added to increase the density of the fluid. These weighting-material solids are capable of inducing formation damage to producing formations.

Thus, there is a need to provide hydrocarbon-based drilling fluids that are preferably solids free or have low solids in the contents in the drilling fluid in order to avoid the above-mentioned disadvantages. Also, there is a need to provide better technology to overcome the above-described problems and preferably to provide technology which can avoid the need for a well shut in and so remove scaling deposits, such as alkaline earth metal sulfate buildup.

SUMMARY OF THE PRESENT INVENTION

A feature of the present invention is to provide compositions which are capable of controlling scaling deposits, which can include alkaline earth metal sulfate buildup, on surfaces, such as well bores.

Another feature of the present invention is to provide compositions which dissolve or solubilize scaling deposits, which can include alkaline earth metal sulfates, on surfaces.

A further feature of the present invention is to provide methods to control scaling deposits, which can include alkaline earth metal sulfates, on surfaces.

An additional feature of the present invention is to provide compositions which are capable of removing the filter cake from the well bore surface, wherein the filter cake may include alkaline earth metal sulfates and polymeric sealant or fluid loss additives.

Another feature of the present invention is to provide compositions which dissolve or solubilize alkaline earth metal sulfates which may be part of the filter cake on a well bore surface.

A further feature of the present invention is to provide methods to remove filter cakes from well bore surfaces which can include alkaline earth metal sulfates as part of the filter cake.

A feature of the present invention is also to provide drilling fluids which are solids free or contain low amounts of solids in the drilling fluids.

Another feature of the present invention is to provide drilling, fluids which are a hydrocarbon-water emulsion which are suitable for use as drilling fluids.

A further feature of the present invention is to provide drilling fluids which can have a variety of different densities in order to be useful in a variety of drilling situations depending on drilling depth and/or other variables.

Another feature of the present invention is to provide a more environmentally friendly drilling fluid that can be primarily aqueous based.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to an aqueous based composition containing at least one alkali metal tungstate and optionally at least one chelating agent. Optionally, one or more alkali metal formates can additionally be present.

The present invention further relates to a method to reduce scaling deposits, which can include alkaline earth metal sulfates, present on a surface and involves contacting the surface with an aqueous based composition containing at least one alkali metal tungstate and optionally at least one chelating agent.

The present invention, in addition, relates to a method to dissolve scaling deposits, which can include alkaline earth metal sulfates, present on a surface using the above-described compositions.

Furthermore, the present invention relates to a method to reduce scaling, including alkaline earth metal sulfates, present on a surface and involves contacting the surface with an aqueous based composition containing at least one alkali metal tungstate and optionally at least one chelating agent, wherein the aqueous based composition is introduced while hydrocarbons are being recovered from a well bore.

The present invention also relates to a completion fluid which contains at least one alkali metal tungstate and optionally at least one chelating agent. Optionally, one or more alkali metal formates can be present in the completion fluids as well as conventional additives.

The present invention further relates to a method to remove a filter cake from a well bore surface, wherein the filter cake can include one or more alkaline earth metal sulfates, and involves contacting the filter cake with an aqueous based composition containing at least one alkali metal tungstate and optionally at least one chelating agent.

The present invention, in addition, relates to a method to dissolve or solubilize alkaline earth metal sulfates, such as barium sulfate, in a filter cake using the above-described compositions.

In addition, the present invention relates to a drilling fluid which contains at least one alkali metal tungstate and preferably at least one surfactant. Optionally, one or more alkali metal formates, wetting agents, hydrocarbons, solid weighting materials, sealing or fluid loss agents, filtration control agents, and/or polymers to further control viscosity and/or other conventional additives such as organoclays and the like can also be optionally present for purposes of the present invention.

The present invention further relates to a method to drill a well comprising drilling of a well in the presence of the above-mentioned drilling fluid of the present invention.

The present invention further relates to a method to minimize or eliminate solids in a drilling fluid by substituting at least a portion of the solids weighting material with at least one alkali metal tungstate and preferably at least one surfactant.

Furthermore, the present invention relates to a completion fluid which contains at least one alkali metal tungstate, and preferably at least one surfactant. Optionally, one or more alkali metal formates, and/or surfactants can be present in the completion fluids as well as conventional additives.

The present invention further relates to a method to remove a filter cake from a well bore surface, wherein the filter cake can include at least one weighting material, and involves contacting the filter cake with an aqueous based composition containing at least one alkali metal tungstate, and preferably at least one surfactant.

The present invention, in addition, relates to a method to dissolve or solubilize weighting material, such as calcium carbonate, in a filter cake using the above-described compositions.

It is to be understood that both the foregoing general description and the following detailed description are exemplary and explanatory only and are intended to provide a further explanation of the present invention, as claimed.

DETAILED DESCRIPTION OF THE PRESENT INVENTION

The present invention relates to fluids containing alkali metal tungstates and their use in drilling fluids, completion fluids, and other fluids associated with drilling and hydrocarbon and other fluid recovery systems. For instance, the present invention relates to compositions capable of dissolving or solubilizing scaling deposits, which can include alkaline earth metal sulfates, which are present on surfaces, such as well bores. The present invention further relates to methods to dissolve or remove scaling deposits, which can include alkaline earth metal sulfates, present on surfaces.

In one embodiment, the composition of the present invention is an aqueous-based composition which contains at least one alkali metal tungstate and optionally at least one chelating agent. The chelating agent is preferably one or more chelating agents which are compatible with the alkali metal tungstate present in the aqueous-based composition. Preferably, the chelating agent is at least partially ionic, such as 10% by weight or more. Preferably, the chelating agent is at least 30% by weight ionic, and more preferably at least 50% by weight ionic, and even more preferably at least 75% by weight ionic, and most preferably is fully ionic. The chelating agent which is preferably ionic can be cationic and/or anionic. The chelating agent can be made ionic by treatments known to those skilled in the art such as treating the chelating agent, which typically has acid groups, with ionic carboxylic groups. Other forms of making the chelating agent ionic include, but are not limited to, reacting the chelating agent with effective amounts of sodium hydroxide, potassium hydroxide, rubidium hydroxide, cesium hydroxide, amine bases such as ammonia, methyl amine, ethylamine, or combinations thereof Examples of suitable chelating agents include, but are not limited to, ethylenediamine tetraacetic acid (EDTA), diethylenetriamine pentaacetic acid (DTPA), citric acid, ascorbic acid, salicylic acid, oxalic acid, or combinations thereof. Preferably, the chelating agent is capable of dissolving or solubilizing scaling deposits and preferably scaling deposits which include alkaline earth metal sulfates. In the present invention, preferably the aqueous based composition which contains the alkali metal tungstate, such as cesium tungstate, and preferably at least one chelating agent provide synergistic results with respect to the rate at which the scaling deposits are dissolved or solubilized and/or the completeness at which the scaling deposits are dissolved or solubilized Generally, once an estimate is made on the amount of scaling deposits present on the surface, a 1:1 molar ratio of the chelating agent to the amount of scalant present can be used in treating the surface to dissolve or solubilize the scaling deposits. Additional amounts or lesser amounts of the aqueous based composition can be used based on routine experimentation in removing or dissolving the scaling which may include the alkaline earth metal sulfates. Mixtures of chelating agents can also be used in the composition of the present invention. In addition, the composition can optionally contain one or more alkali metal formates, such as cesium formate and/or potassium formate The alkali metal tungstate(s) includes cesium tungstate, sodium tungstate, lithium tungstate, rubinium tungstate, potassium tungstate, or combinations thereof A preferred alkali metal tungstate is cesium tungstate. The alkali metal tungstate can be prepared a number of ways, such as the methods described in U.S. Pat. No. 4,083,922, which is incorporated in its entirety by reference herein and forms a part of the present invention. In general, alkali metal hydroxides (e.g., cesium hydroxide) can be reacted with tungstic acid (for instance at room temperature in a 2:1 molar ratio of hydroxide to tungstic acid) to form the alkali metal tungstates of the present invention. A variety of densities of the fluids of the present invention can be achieved with the tungstates of the present invention. For instance, densities of up to about 3.1 s.g. or more can be achieved with, for example, cesium tungstate. As another example, potassium tungstate can have densities of up to 2.17 s.g. Other densities below and above these values exemplified above are obtainable. The tungstates of the present invention are compatible with alkali metal formates at any ratio. The blending in all ratios of alkali metal formates and alkali metal tungstates provides for a complete range of fluid densities with improved properties over those of the alkali metal formates alone. The addition of saturated cesium tungstate to saturated cesium formate, for instance, provides for fluids at ambient conditions with densities greater than 2.3 s.g., which is generally the highest density obtained with saturated cesium formate alone, and further permits crystallization temperatures that are much lower than obtainable with cesium formate alone. For example, cesium formate with a density of 2.3 s.g. has a crystallization temperature of about 70° F., while a cesium formate—cesium tungstate blend (10-15 wt % cesium tungstate) with the same density has a crystallization temperature of about 45° F., which is unexpected. Further, the tungstates and formates are stable together at high temperatures, such as 390° F. or higher, with no crystallization or separation. As tungstates are naturally buffered, and have higher thermal stability than the organic formate salts, they add further improvement to the buffering ability of formates, thermal stability, non-oxidative and improve the inhibition of corrosion. An example of an alkali metal tungstate as represented by a structure is as follows:

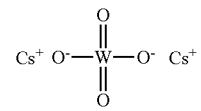

The alkali metal tungstate present in the aqueous-based composition is preferably present in an amount of less than 85% by weight on a solution basis. The alkali metal tungstate is preferably not fully saturated in the aqueous-based solution so as to preferably permit the optional chelating agent to solubilize in the solution along with the alkali metal tungstate. Preferably, the alkali metal tungstate is present in an amount of less than 80% by weight based on a solution basis and more preferably is from about 60% to about 80% by weight.

The alkali metal tungstate that is present in the fluids of the present invention, preferably as a soluble salt, as stated above, can be present in any concentration and the alkali metal tungstate, such as cesium tungstate is generally a liquid at room temperature. Therefore, the concentration of the alkali metal tungstate in the fluids of the present invention, such as a completion fluid, can be from about 1% to about 100% by weight, and more preferably is present in an amount of from about 40% to about 95% by weight, and even more preferably is present in the fluid at a range of from about 55% to about 85% by weight or is present in the fluid at a range of from about 70% to about 85% by weight, based on the weight of the fluid. Besides the chelating agent(s) and other possible ingredients, the remainder of the fluid can be water or other aqueous solutions. Conventional ingredients used in oil well fluids, such as completion fluids, can also be used in the fluids of the present invention.

The pH of the alkali metal tungstate fluids can be any pH. For instance, the pH is preferably from about 10 to about 13, and more preferably from about 10 to about 11. While no additives are needed to maintain these preferred pH ranges, the alkali metal tungstate(s) can have their pH adjusted by standard buffering techniques such as with the use of KOH, trisodium phosphate, and/or potassium carbonate or other buffering agents which are compatible with the alkali metal tungstate(s).

The alkali metal tungstate can be present in any molar amount but is preferably present in an amount of from about 3 M to about 12 M, and more preferably from about 5 M to about 7.5 M. Similarly, the chelating agent can be present in any molar amount, but is preferably present in an amount of from about 0.2 M to about 1.0 M, and more preferably from about 0.5 M to about 0.6 M. Also, the pH of the composition can be any pH as long as the composition is capable of solubilizing or dissolving at least a portion of the scaling deposits, preferably including alkaline earth metal sulfate, present on a surface. Preferably, the pH of the aqueous-based composition is from about 9 to about 14 and more preferably from about 11 to about 13.

Also, as mentioned above, the density of the composition can be adjusted to any desired density. This can especially be done with the introduction of two or more alkali metal tungstates and/or with the introduction of one or more alkali metal formates, such as cesium formate or potassium formate. As an example, when an aqueous-based composition contains alkali metal tungstate such as cesium tungstate and at least one chelating agent, the density can range from about 1.9 to about 3.1. This density range can be adjusted with the introduction of cesium formate or potassium formate. For instance, when 0-100% amount of potassium formate is included in the aqueous-based composition, the density of the overall aqueous-based composition can range from about 1.2 to about 2.4. Thus, the density of the aqueous-based composition can essentially be "dialed-in" to meet the density needed for the composition to be introduced into the well bore at the appropriate depth. Discussion of the benefits of the aqueous-based compositions for well use is provided below.

The present invention further relates to a method to remove scaling deposits that are present on a surface With the present invention, the scaling deposits present on a surface can be dissolved or solubilized. Also, with the present invention, the amount of scaling deposits present on a surface can be reduced or controlled. Typically, the scaling deposits, which can include alkaline earth metal sulfate(s), present on a surface will be in the form of scaling. In a preferred embodiment, this scaling occurs on well bores and other surfaces relating to the recovery of hydrocarbons from wells.

The method for removing the scaling deposits on a surface is accomplished by contacting the surface containing the scaling deposits with the above-described composition which contains at least one alkali metal tungstate and optionally at least one chelating agent.

The manner in which the composition of the present invention contacts the scaling deposits can be by any means. The composition of the present invention can be injected at the point of the scaling buildup and/or the composition of the present invention can be pumped into the well in order to contact the scaling deposits present in the well bore. In applications outside of the recovery of hydrocarbons, the compositions of the present invention can be sprayed or poured onto the surface having any scaling deposits.

In a preferred embodiment, the method of removing scaling deposits can be accomplished while the well is in operation. In such an embodiment, the composition of the present invention can be introduced into the well bore generally at the bottom hole of the well. Moreover, in this embodiment of removing scaling deposits wherein the well is in operation, the aqueous-based composition can include one or more types of an alkali metal tungstate along preferably with at least one chelating agent. In other words, the aqueous-based composition used for this embodiment can be an aqueous-based composition which contains a) at least one type of alkali metal tungstate, such as cesium tungstate alone, sodium tungstate alone, or potassium tungstate alone or along preferably with b) at least one chelating agent(s). Depending upon the density needed in order to remain at the location where the scaling deposits are located, potassium tungstate can be used alone or along with at least one chelating agent, or combinations of various alkali metal tungstates can be used alone or along with at least one chelating agent. When operating in a live well, the temperature of the well will generally be from about 50° C. or lower to over 250° C. These temperatures will be sufficient to permit the scaling including, if present, the alkaline earth metal sulfates, to be dissolved or solubilized and removed. Generally, the higher the temperature, the faster the rate of dissolving of the scaling deposits. The use of the alkali metal tungstates permits the aqueous-based compositions to obtain sufficient density necessary to remain in a live well and not be removed along with the recovery of the hydrocarbons and not be removed by any hydrostatic pressure that is built up on the well. The ability of the aqueous-based composition to provide such scaling control meets a need in the industry wherein there are no known commercially available compositions which remove scalants by such a process while a well is in operation.

Generally, the compositions of the present invention can be introduced by a coil tubing which fits inside the production tubing of a well. This coil tubing can be inserted such that it can reach any point of the well and preferably reaches to the bottom of the well where the compositions of the present invention can be pumped and/or jetted into the well bore. The density of the compositions of the present invention should be such that the composition remains at the location where it was introduced. With the proper density, the oil or other hydrocarbons being recovered can be pumped or forced to the surface without substantially taking along the compositions of the present invention. Over time, the rate of the dissolution of the compositions of the present invention will decrease by being contacted with the oil and any other water being released during recovery of the hydrocarbons. This will eventually dilute the compositions such that the composition is eventually pumped to the surface along with the recovery of hydrocarbons to the surface. Once recovered at the surface, the composition of the present invention will separate from the hydrocarbon, such as oil, by the separation of water/oil phases. The scaling, like barium sulfate, which has been dissolved or solubilized by the composition of the present invention will precipitate out of solution due to the lowering of temperature at the surface of the well. Accordingly, the recovery of hydrocarbons is not affected by the use of the composition of the present invention and the scaling, like barium sulfate, is quite easily separated as well.

In a preferred embodiment, the temperature of the well which is generally 50° C. or higher and can reach 200° C.

or higher will permit the dissolving or solubilizing of the scaling deposits by the compositions of the present invention.

For purposes of the present invention, the rate of dissolution can be controlled depending on the specific tungstate(s) and chelating agent(s) used and/or the temperature where the scaling is occurring. If necessary, the aqueous-based composition can be heated before or while contacting a surface to reach optimum dissolving temperatures.

The amount of the composition of the present invention for purposes of removing scaling deposits is an amount sufficient to remove the scaling deposits. Preferably, this amount is from about 3 to about 0.5, and more preferably from about 1.5 to about 1.0, which is based on moles of chelant per moles of scale.

The methods of the present invention can also be used in a well which is being worked over and therefore shutdown. In such a method, again, the compositions of the present invention can be introduced into the well bore at any point or pumped into the entire well. The compositions of the present invention can be introduced with pressure applied so as to flow the compositions of the present invention not only into the well bore but also into the surrounding formation and therefore the compositions of the present invention will not only remove scaling present on the well bore but also in the formation where the well was originally drilled into. This process is typically known as a "squeeze" treatment.

As indicated above, the compositions of the present invention used for removing scaling deposits is preferably accomplished in high temperatures, such as 50° C. or higher. For purposes of the present invention, scaling deposits includes any type of mineral compound buildup on a surface, such as calcium carbonates, alkaline earth metal sulfates, sulfide compounds, iron scales, and the like. For purposes of the present invention, the removing or dissolving of scaling deposits would involve the removal of at least one type of the scale and preferably a majority if not all of the various types of scales that are on a surface, especially the type of scaling that occurs in well bores. Alkaline earth metal sulfate includes barium sulfate and other sulfates such as strontium sulfate and calcium sulfate, or combinations thereof The present invention further relates to completion fluids for use in drilling and completion operations. The present invention, in addition, relates to methods of removing or dissolving filter cakes on the surfaces of well bores after completion of the well.

The completion fluid of the present invention is preferably an aqueous-based composition which contains at least one alkali metal tungstate and preferably at least one chelating agent. Preferably, the completion fluid contains cesium tungstate as the alkali metal tungstate. More preferably, the completion fluid contains two or more alkali metal tungstates where preferably one of the alkali metal tungstates is cesium tungstate. A preferred combination of tungstates includes, but is not limited to, cesium tungstate with potassium tungstate. The various fluid compositions discussed above and throughout this application can be used as completion fluids.

As an option, one or more surfactants and/or mutual solvents can be included in the completion fluids or other compositions of the present invention. A surfactant or mutual solvent is particularly preferred when the completion fluid is used after an OBM or SBM drilling fluid. The surfactant or mutual solvent is preferably one which is capable of suspending or emulsifying the oil-based components of the OBM or SBM; thus allowing the formate and chelant to reach the alkaline earth metals sulfates, such as barium sulfate, in order to solubilize the alkaline earth metal sulfates as described above. The surfactant and/or mutual solvent(s) can also be used in the completion fluids or other fluids of the present invention when a synthetic based mud or water based mud is used as the drilling fluid. A variety of different surfactants and/or mutual solvents can be used in the present invention. Examples of surfactants or mutual solvents that can be used include, but are not limited to, sodium and ammonium salts of acrylic acid copolymers, including copolymers containing adducts of ethylene oxide and propylene oxide; hydroxyethylethylene urea and polymeric species thereof, and more preferably mixtures of these two classes of surfactant/mutual solvent types. Typically, the amount of surfactant or mutual solvent is an amount effective to emulsify or suspend the oil-based components of the OBM. Preferred amounts include from about 0.5 to about 10% by weight of the completion fluid.

The alkali metal tungstate that is present in the completion fluid is preferably present in an amount of less than 85% by weight on a solution basis. The alkali metal tungstate is preferably not fully saturated in the aqueous-based solution so as for instance, to permit the chelating agent to solubilize in the solution along with the alkali metal tungstate. Preferably, the alkali metal tungstate is present in an amount of less than 80% by weight based on a solution basis and more preferably is from about 60% to about 80% by weight.

The alkali metal tungstate, such as cesium tungstate, can be present in any molar amount in the completion fluid, and is preferably present in an amount of from about 3 M to about 12 M, and more preferably from about 5 M to about 7.5 M. Similarly, the chelating agent can be present in any molar amount, and is preferably present in an amount of from about 0.2 M to about 1.0 M, and more preferably from about 0.5 M to about 0.6 M. Also, the pH of the composition can be any pH as long as the composition is capable of solubilizing or dissolving at least a portion of the filter cake which may include at least one alkaline earth metal sulfate, particularly barite. Preferably, the pH of the completion fluid is from about 9 to about 14, and more preferably from about 11 to about 13. Additionally, filter cakes often contain insoluble polysaccharides which can be solubilized or dispersed or flocculated at high pH with the use of the completion fluids of the present invention.

The temperatures of the well will generally be sufficient to dissolve or solubilize any alkaline earth metal sulfates that may be present in the filter cake along with the removal of the sealing agents, also known as fluid loss agents, such as calcium carbonate or other components used in the drilling fluid and which primarily form the filter cake. For purposes of the present invention, the rate of dissolution of the filter cake, especially when the filter cake contains one or more alkaline earth metal sulfates, can be controlled depending on the specific tungstate(s) and chelating agent(s) used and/or the temperature where the filter cake is located in the well bore. If necessary, the completion fluid can be heated before or while contacting a filter cake surface to reach optimum dissolving temperatures. Heat can be applied to the solution by direct thermal methods, microwave, ultrasonic methods, or other heat transfer techniques.

Accordingly, the present invention further relates to a spent completion fluid which contains at least one alkali metal tungstate, preferably at least one chelating agent and at least a portion of a dissolved or solubilized filter cake. The filter cake can contain a fluid loss agent, drilling fines, one or more alkaline earth metal sulfates, other conventional ingredients, and combinations thereof The amount of the completion fluid of the present invention used for purposes of removing the filter cake is an amount sufficient to remove the filter cake located on the well bore. Preferably, this amount is from about 3 to about 0.5 and more preferably from about 1.5 to about 1.0, which is based on moles of chelating agent per moles of alkaline earth metal in the filter cake.

The present invention further relates to other completion fluids for use in drilling and completion operations. The present invention further relates to methods of removing or dissolving filter cakes on the surfaces of well bores during or after completion of the well.

In this embodiment, the completion fluid of the present invention is preferably an aqueous-based composition which contains at least one alkali metal tungstate, and preferably at least one surfactant. Preferably, the completion fluid contains cesium tungstate as the alkali metal tungstate. More preferably, the completion fluid contains two or more alkali metal tungstates, where preferably one of the alkali metal tungstates is cesium tungstate. A preferred combination of tungstates includes, but is not limited to, cesium tungstate with potassium tungstate. Other combinations of alkali metal tungstates can be used, such as sodium tungstate and potassium tungstate, or sodium tungstate and cesium tungstate.

Preferably, one or more surfactants and/or mutual solvents can be included in the completion fluids of the present invention. A surfactant and/or mutual solvent is particularly preferred when the completion fluid is used to displace and remove the filter cake of an OBM or SBM drilling fluid. The surfactant or mutual solvent is preferably one which is capable of suspending or emulsifying the oil-based components of the OBM or SBM; thus allowing the composition to reach the components of the filter cake, such as calcium carbonate and polymeric materials in order to dissolve or solubilize these components of the filter cake. The surfactant and/or mutual solvent(s) can also be used in the completion fluids of the present invention when a water based mud is used as the drilling fluid. A variety of different surfactants or mutual solvents can be used in the present invention. Examples of surfactants or mutual solvents that can be used in the completion fluids of the present invention include, but are not limited to, ethylene oxide and propylene oxide adducts of acrylate copolymers, and hydroxyethylethylene urea polymers, monobutyl ethylene glycol, ethoxylated long chain alcohols, sulfated long chain alcohols, and the like. Typically, the amount of surfactant and/or mutual solvent is an amount effective to emulsify or suspend the oil-based components of the OBM or SBM. Preferred amounts include from about 0.5 wt % to about 20 wt %, and more preferably from about 5 wt % to about 10 wt %, based on the weight of the fluid.

Also, the pH of the composition can be any pH as long as the composition is capable of solubilizing or dissolving at least a portion of the filter cake which may include calcium carbonate and/or at least one alkaline earth metal sulfate, particularly barite. Preferably, the pH of the completion fluid is from about 2 to about 7, and more preferably from about 3 to about 6. Also, as described earlier, the density of the completion fluid can be adjusted to any desired density using one or more alkali metal tungstates and/or alkali metal formates.

For purposes of the present invention, the rate of dissolution of the filter cake can be controlled depending on the specific tungstate(s) used and/or the temperature where the filter cake is located in the well bore. If necessary, the completion fluid can be heated before or while contacting a filter cake surface to reach optimum dissolving temperatures. Heat can be applied to the solution by direct thermal methods, microwave, ultrasonic methods, or other heat transfer techniques.

Accordingly, the present invention further relates to a spent completion fluid which can contain at least one alkali metal tungstate, and/or at least a portion of a dissolved or solubilized filter cake, and preferably at least one surfactant and/or mutual solvent. The filter cake can contain a fluid loss agent, drilling fines, weighting agents, drilling polymers, calcium carbonate, other conventional ingredients, and/or combinations thereof The spent completion fluid can be recycled, for instance, by raising the pH of the fluid to a pH range of from about 10.5 to about 12 using a metal salt, such as, but not limited to, sodium hydroxide, potassium hydroxide, and/or cesium hydroxide. The fluid, by this procedure precipitates divalent ions, such as Ca, and once the fluid is filtered, the tungstate fluid is reclaimed and now reuseable.

The amount of the completion fluid of the present invention for purposes of removing the filter cake is an amount sufficient to remove the filter cake located on the well bore.

Accordingly, the present invention further relates to a method to remove a filter cake that is present in a well bore. The method for removing the filter cake on the well bore surface is accomplished by contacting the filter cake with the above-described completion fluid of the present invention in the manner described above.

The completion fluids of the present invention can be introduced into the well bore by any conventional technique, such as, but not limited to, being pumped and/or jetted into the well bore by conventional techniques or with coiled tube operations, bullheading, or using gas lift mandrels Over time, the completion fluid, once the well is in operation will be brought to the surface with the recovery of hydrocarbons or water if the well is used for injection from the well. Once recovered at the surface, the completion fluid of the present invention will separate from the hydrocarbon, such as oil, by the separation of water/oil phases. The components of the filter cake, such as barium sulfate, if present, which has been dissolved or solubilized by the completion fluid of the present invention will precipitate out of solution due to the lowering of temperature at the surface of the well. Accordingly, the recovery of hydrocarbons is not affected by use of the completion fluids of the present invention and the components of the filter cake can be easily separated as well.

The completion fluids of the present invention and their use in removing the filter cake on a well bore surface provide a number of advantages over conventional completion fluids. First of all, the completion fluids of the present invention can have a range of densities to efficiently and effectively be introduced and remain in the well bore in order to remove the filter cake Further, with the completion fluids of the present invention, no corrosion inhibitors are needed since preferably no acids are in the completion fluids of the present invention. Thus, damage to the well formation can be avoided. Furthermore, the completion fluids of the present invention preferably have a high pH which again is advantageous since low pH fluids which contain corrosion inhibitors can be damaging to the well formation. In addition, the completion fluids of the present invention can remove alkaline earth metal sulfates that may be present as part of the filter cake or be trapped by the filter cake. Thus, the completion fluids of the present invention and the methods of removing filter cakes using the completion fluids of the present invention provides numerous advantages over conventional completion fluids.

The present invention also relates to drilling fluids for use in drilling operations. For instance, the drilling fluid can be used in the drilling of a well for hydrocarbon recovery such as oil and/or gas. The drilling fluids of the present invention can also be used in other drilling operations where drilling fluids are used.

The drilling fluids of the present invention can have any of the above-mentioned formulations. For instance, the drilling fluid of the present invention can contain at least one alkali metal tungstate and preferably at least one surfactant or emulsifier. The drilling fluid of the present invention can contain an emulsion of an aqueous-based solution with a hydrocarbon-based fluid for purposes of forming the drilling fluid wherein the drilling fluid contains at least one alkali metal tungstate and preferably at least one surfactant along with at least one hydrocarbon-based fluid.

Preferably, the drilling fluid contains cesium tungstate as the alkali metal tungstate. More preferably, the drilling fluid contains two or more alkali metal tungstates, wherein preferably one of the alkali metal tungstates is cesium tungstate. A preferred combination of tungstates includes, but is not limited to, cesium tungstate with potassium tungstate. Other combinations of alkali metal tungstates can be used, such as sodium tungstate and potassium tungstate or sodium tungstate and cesium tungstate. Essentially, any combination of one or more alkali metal tungstates can be used for purposes of the drilling fluids of the present invention. As mentioned above, one or more alkali metal formates can be used in combination with the alkali metal tungstates. Any weight ratios of the tungstates and formates can be used.

Preferably, with respect to the drilling fluid of the present invention, at least 35% by volume of the fluid in the drilling fluid is an aqueous-based solution containing at least one alkali metal tungstate. More preferably, at least 50% by volume of the fluids present in the drilling fluid is an aqueous-based solution containing at least one alkali metal tungstate and even more preferably at least 75% by volume of the fluids present in the drilling fluid of the present invention is an aqueous-based solution containing at least one alkali metal tungstate. Most preferably, at least 90% by volume of the fluids present in the drilling fluid of the present invention is an aqueous-based solution containing at least one alkali metal tungstate. In another embodiment, at least 95% or more by volume of the fluids of the present invention contain an aqueous-based solution containing at least one alkali metal tungstate. In one embodiment, all of the fluids present are an aqueous-based solution containing at least alkali metal tungstate wherein essentially no hydrocarbon, or oil is present in the drilling fluid. Since the alkali metal tungstate is preferably dissolved in the aqueous solution, the drilling fluid can be solids free since the alkali metal tungstate preferably acts as a lubricant and a weighting material.

When a hydrocarbon fluid or synthetic mud fluid is present in the drilling fluids of the present invention, conventional hydrocarbon fluids or synthetic mud fluids can be used in the drilling fluids of the present invention. Examples include, but are not limited to, diesel oil such as diesel oil number 2, crude oil, synthetic oils (such as paraffin oils, olefin oils, vegetable oils, and the like), as well as other conventional hydrocarbon fluids Combinations of various hydrocarbon fluids or synthetic mud fluids can be used for purposes of the present invention. If a hydrocarbon or synthetic mud fluid is present in the drilling fluid of the present invention, various ratios of the hydrocarbon fluid to the aqueous-based solution described above can be used, such as ratios of 65% by volume hydrocarbon fluid: 35% aqueous based solution to 1% by volume hydrocarbon fluid: 99% by volume aqueous based solution.

When a hydrocarbon fluid is present with the aqueous-based solution containing at least one alkali metal tungstate, at least one emulsifier or surfactant is preferably present in order to produce an emulsion of the ingredients. Essentially any emulsifier(s) or surfactant(s) capable of forming an emulsion between the hydrocarbon fluid and the aqueous based solution can be used for purposes of the present invention. Examples include, but are not limited to, a dimer trimer acid such as Witco DTA 350, imadazoline, tall oil (stearic acid), Integrity Synvert IV, Integrity Synvert TWA, and the like. Any amount of surfactant or emulsifier can be used to form the emulsion such as from about 1 to about 30 pounds per barrel, wherein a barrel is about 42 gallons.

Other optional ingredients that can be present in the drilling fluids of the present invention include a filtration control agent or pore bridging materials such as Gilsonite and the like. These filtration control agents can be used in conventional amounts.

Other ingredients that can be present in the drilling fluids of the present invention include solid weighting materials such as barite, hematite, and/or calcium carbonate. These solid weighting materials can be used if desired. The amount of solid weighting material, which is optional, can be from about 0.5 pound per barrel to about 100 pounds per barrel.

Another optional ingredient in the drilling fluids of the present invention is a wetting agent which can be helpful in emulsifying the alkali metal tungstate fluids with the hydrocarbon-based external fluids. An example of a suitable wetting agent is Integrity Synvert TWA. Conventional amounts can be used in combination with the emulsifiers described above in order to achieve desired emulsions of the formate fluids with the hydrocarbon-base external fluids.

Other ingredients that can optionally be present include, but are not limited to, other drilling fluid products such as polymer(s) to add to viscosity, hydrophilic clays, fluid loss control additives, and the like. These other optional ingredients can be used in conventional amounts known to those skilled in the art.

The alkali metal tungstate(s) that is present as part of the aqueous-based solution can be not fully saturated in the aqueous-based solution so as to permit any remaining water-soluble components to preferably solubilize in the solution along with the alkali metal formate. Thus, the alkali metal formate that is present in the aqueous-based solution can be present in an amount of less than 80% by weight, based on the aqueous-based solution basis, and more preferably is from about 60% to about 80% by weight.

The important advantage of the present invention is the ability for the density of the drilling fluid to be adjusted to any desired density. This can especially be done with the introduction of a combination of alkali metal tungstates and optionally with the introduction of alkali metal formates, such as potassium formate and/or cesium formate. Thus, the drilling fluids of the present invention make it possible to achieve a variety of different densities and to minimize or completely eliminate the solid weighting material that is present in conventional drilling fluids.

The drilling fluids of the present invention can be introduced into the well bore by any conventional technique such as, but not limited to, being pumped into the drill pipe. Further, the drilling fluids can be recovered using conventional techniques.

The drilling fluids of the present invention can be prepared by mixing all of the components together. When an emulsion is prepared, typically, the components will be mixed together such as by shearing in order to ensure a dispersion that is preferably uniform with respect to the components.

For purposes of the present invention, when a hydrocarbon-based external fluid is used with at least one tungstate fluid as described above, the tungstate fluids can be partially or totally emulsified into the hydrocarbon-based fluid. Or, in the alternative, when a majority of the drilling fluid is a tungstate fluid, the hydrocarbon-based fluid, if present, can be partially or totally emulsified into the tungstate fluid.

Optionally, the drilling fluids or completion fluids or other fluids of the present invention can also contain at least one acid.

The alkali metal formates, if present, are commercially available. For instance, the cesium formate can be obtained from Cabot Corporation The cesium formate can be made, for instance, by following the description as set forth in International Published Patent Application No. WO 96/31435, incorporated in its entirety by reference herein. The cesium formate that is present in the drilling fluid, preferably as a soluble salt, as stated above, can be present in any concentration and the cesium formate solution is a liquid at room temperature. Therefore, the concentration of the cesium formate in the drilling fluid can be from about 1% to about 100% by weight, and more preferably is present in an amount of from about 40% to about 95% by weight, and even more preferably is present in the drilling fluid at a range of from about 55% to about 85% by weight or is present in the drilling fluid at a range of from about 70% to about 85% by weight based on the weight of the drilling fluid. Besides the optional ingredients and preferably the surfactant and/or hydrocarbon fluid, the remainder of the drilling fluid can be water or other aqueous solutions. Conventional ingredients used in drilling fluids can also be used with the drilling fluid of the present invention.

Other alkali metal formates that can be used in the present invention are potassium formate and sodium formate which are commercially available. These alkali metal formates can also be prepared in a similar fashion as the cesium formate solution described above, and are also frequently obtained as by-products from ester hydrolysis.

As additional embodiments, alkali metal molybdenate(s) can be used in combination with one or more alkali metal tungstates in any combination for any of the applications described above. Furthermore, one or more alkali metal molybdenates, such as potassium molybdenate and/or cesium molybdenate, can be used in lieu of an alkali metal tungstates in all of the applications described above using similar amounts.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof

What is claimed is:

1. An aqueous-based composition comprising at least one alkali metal tungstate present in an amount of from about 3 M to about 12 M, at least one chelating agent present in an amount of from about 0.2 M to about 1.0 M, and at least one alkali metal formate.

2. The composition of claim 1, wherein said chelating agent is at least partially ionic.

3. The composition of claim 1, wherein said chelating agent is at least 10% ionic.

4. The composition of claim 1, wherein said chelating agent is at least 50% ionic.

5. The composition of claim 1, wherein said chelating agent is at least 75% ionic.

6. The composition of claim 1, wherein said chelating agent is fully ionic.

7. The composition of claim 1, wherein said chelating agent is anionic.

8. The composition of claim 1, wherein said pH of said composition is from about 9 to about 14.

9. The composition of claim 1, wherein said chelating agent is diethylenetriamine pentaacetic acid.

10. The composition of claim 1, wherein said chelating agent is diethylenetriamine pentaacetic acid having carboxylate anions.

11. The composition of claim 1, wherein said composition has a density of from about 1.2 to about 3.1.

12. The composition of claim 1, wherein said aqueous-based composition is less than fully saturated with said alkali metal tungstate.

13. A method to reduce alkaline earth metal sulfate present on a well bore surface formed to recover hydrocarbons comprising contacting said alkaline earth metal sulfate with an aqueous-based composition comprising at least one alkali metal tungstate and at least one chelating agent, wherein said composition and dissolved alkaline earth metal sulfate are recovered.

14. A method to dissolve alkaline earth metal sulfate present on a well bore surface formed to recover hydrocarbons comprising contacting said alkaline earth metal sulfate with an aqueous-based composition comprising at least one alkali metal tungstate and at least one chelating agent, wherein said composition and dissolved alkaline earth metal sulfate are recovered.

15. The method of claim 14, wherein said composition is introduced at the bottom hole of the well bore.

16. The method of claim 14, wherein said composition is introduced while recovery of hydrocarbons is occurring from said well bore.

17. The method of claim 14, wherein said composition reaches a temperature of at least 50° C. in the presence of said alkaline earth metal sulfate.

18. The method of claim 14, wherein said composition reaches a temperature of from about 50° C. to about 200° C. when in the presence of said alkaline earth metal sulfate.

19. The method of claim 16, wherein said composition and dissolved alkaline earth metal sulfate are recovered from the well bore at the surface of the well and wherein said composition separates from the hydrocarbons by phase separation and said alkaline earth metal sulfate precipitates out of solution.

20. A method to dissolve scaling deposits present on a surface comprising contacting said scaling deposits with an aqueous-based composition comprising at least one alkali metal tungstate and at least one chelating agent, wherein said scaling deposits are present on a well bore surface for recovery of hydrocarbons, and wherein said composition and dissolved scaling deposits are recovered.

21. The method of claim 20, wherein said composition is introduced at the bottom hole of the well bore.

22. The method of claim 20, wherein said composition is introduced while recovery of hydrocarbons is occurring from said well bore.

23. The method of claim 20, wherein said composition reaches a temperature of at least 60° C. in the presence of said scaling deposits.

24. The method of claim 20, wherein said composition reaches a temperature of from about 50° C. to about 200° C. when in the presence of said scaling deposits.

25. The method of claim 22, wherein said composition and dissolved scaling deposits are recovered from the well bore at the surface of the well and wherein said composition separates from the hydrocarbons by phase separation and said scaling deposits precipitate out of solution.

26. A method to remove scaling deposits present on a well bore surface comprising contacting said scaling deposits with an aqueous-based composition comprising at least one alkali metal tungstate and optionally at least one chelating agent, wherein said composition is introduced while recovery of hydrocarbons is occurring from said well bore, wherein said aqueous-based composition further comprises at least one alkali metal formate.

27. The method of claim 26, wherein said alkali metal formate comprises potassium formate, cesium formate, sodium formate, or combinations thereof.

28. The method of claim 26, wherein said at least one alkali metal tungstate comprises cesium tungstate, sodium tungstate, potassium tungstate, or combinations thereof.

29. The method of claim 26, wherein said composition and dissolved scaling deposits are recovered from the well bore at the surface of the well and wherein said composition separates from the hydrocarbons by phase separation and at least a portion of said scaling deposits precipitate out of aqueous solution.

30. The method of claim 26, wherein said scaling deposits comprise at least one alkaline earth metal sulfate.

31. The method of claim 26, wherein the alkali metal tungstate is present in an amount of from about 3 M to about 12 M and said at least one chelating agent is present in an amount of from about 0.2 to about 1.0 M.

32. The method of claim 26, wherein said chelating agent is present and is at least partially ionic.

33. The method of claim 26, wherein said chelating agent is present and is at least 10% ionic.

34. The method of claim 26, wherein said chelating agent is present and is at least 50% ionic.

35. The method of claim 26, wherein said chelating agent is present and is at least 75% ionic.

36. The method of claim 26, wherein said chelating agent is present and is fully ionic.

37. The method of claim 26, wherein said chelating agent is present and is anionic.

38. The method of claim 26, wherein said pH of composition is from about 9 to about 14.

39. The method of claim 26, wherein said chelating agent is present and is diethylenetriamine pentaacetic acid.

40. The method of claim 26, wherein said chelating agent is present and is diethylenetriamine pentaacetic acid having carboxylate anions.

41. The method of claim 26, wherein said composition has a density of from about 1.2 to about 2.4.

42. The method of claim 26, wherein said aqueous-based composition is less than fully saturated with said alkali metal tungstate.

43. A completion fluid comprising the composition of claim 1.

44. The completion fluid of claim 43, wherein said alkali metal tungstate comprises cesium tungstate, sodium tungstate, potassium tungstate or combinations thereof.

45. The completion fluid of claim 43, wherein said alkali metal formate comprises cesium formate or potassium formate or both.

46. The completion fluid of claim 43, wherein the alkali metal tungstate is present in an amount of from about 3 M to about 12 M and said at least one chelating agent is present in an amount of from about 0.2 M to about 1.0 M.

47. The completion fluid of claim 43, wherein said chelating agent is at least partially ionic.

48. The completion fluid of claim 43, wherein said chelating agent is at least 10% by weight ionic.

49. The completion fluid of claim 43, wherein said chelating agent is at least 50% by weight ionic.

50. The completion fluid of claim 43, wherein said chelating agent is at least 75% by weight ionic.

51. The completion fluid of claim 43, wherein said chelating agent is fully ionic.

52. The completion fluid of claim 43, wherein said chelating agent is anionic.

53. The completion fluid of claim 43, wherein said pH of said completion fluid is from about 9 to about 14.

54. The completion fluid of claim 43, wherein said chelating agent is diethylenetriamine pentaacetic acid.

55. The completion fluid of claim 43, wherein said chelating agent is diethylenetriamine pentaacetic acid having carboxylate anions.

56. The completion fluid of claim 43, wherein said completion fluid has a density of from about 1.2 to about 3.1.

57. The completion fluid of claim 43, wherein said completion fluid is less than fully saturated with said alkali metal tungstate.

58. A spent completion fluid comprising at least one alkali metal tungstate, a dissolved or solubilized filter cake, and optionally at least one chelating agent, wherein said at least one alkali metal tungstate is present in an amount sufficient to reduce or dissolve alkali earth metal sulfate in said filter cake, wherein said filter cake comprises at least one alkaline earth metal sulfate and at least one fluid loss agent.

59. The spent completion fluid of claim 58, wherein said alkaline earth metal sulfate comprises barium sulfate.

60. The spent completion fluid of claim 58, wherein said filter cake further comprises drilling fines.

61. The spent completion fluid of claim 58, further comprising at least one alkali metal formate.

62. The spent completion fluid of claim 58, wherein said alkali metal tungstate comprises cesium tungstate, potassium tungstate, sodium tungstate, or combinations thereof.

63. The spent completion fluid of claim 61, wherein said alkali metal formate comprises cesium formate or potassium formate, or both.

64. The spent completion fluid of claim 58, wherein the alkali metal tungstate is present in an amount of from about 3 M to about 12 M and said at least one chelating agent is present in an amount of from about 0.2 M to about 1.0 M.

65. The spent completion fluid of claim 58, wherein said chelating agent is present and is at least partially ionic.

66. The spent completion fluid of claim 58, wherein said chelating agent is present and is at least 10% by weight ionic.

67. The spent completion fluid of claim 58, wherein said chelating agent is present and is at least 50% by weight ionic.

68. The spent completion fluid of claim 58, wherein said chelating agent is present and is at least 75% by weight ionic.

69. The spent completion fluid of claim 58, wherein said chelating agent is present and is fully ionic.

70. The spent completion fluid of claim 58, wherein said chelating agent is present and is anionic.

71. The spent completion fluid of claim 58, wherein said pH of said completion fluid is from about 9 to about 14.

72. The spent completion fluid of claim 58, wherein said chelating agent is present and is diethylenetriamine pentaacetic acid.

73. The spent completion fluid of claim 58, wherein said chelating agent is present and is diethylenetriamine pentaacetic acid having carboxylate anions.

74. The spent completion fluid of claim 58, wherein said spent completion fluid has a density of from about 1.2 to about 3.1.

75. The spent completion fluid of claim 58, wherein said spent completion fluid is less than fully saturated with said alkali metal tungstate.

76. A method to remove a filter cake present on a well bore surface comprising contacting said filter cake with the completion fluid of claim 52.

77. The method of claim 76, wherein said filter cake comprises a fluid loss agent.

78. The method of claim 76, wherein said filter cake comprises at least one alkaline earth metal sulfate and at least one fluid loss agent.

79. The method of claim 76, wherein said filter cake further comprises drilling fines.

80. The method of claim 76, wherein said completion fluid reaches a temperature of at least 50° C. in the well bore.

81. The method of claim 76, wherein said completion fluid reaches a temperature of from about 50° C. to about 200° C. in the well bore.

82. The method of claim 76, wherein said completion fluid and dissolved or solubilized filter cake are recovered.

83. The method of claim 76, wherein said completion fluid and dissolved or solubilized filter cake are recovered from the well bore at the surface of the well during recovery of hydrocarbons and wherein said completion fluid separates from the hydrocarbons by phase separation and said filter cake or a portion thereof precipitates out of solution.

84. The completion fluid of claim 43, further comprising at least one surfactant or mutual solvent, or both.

85. The completion fluid of claim 84, wherein said surfactant or mutual solvent is capable of suspending or emulsifying oil-based components in an oil-based mud or synthetic based mud.

86. The spent completion fluid of claim 58, further comprising at least one surfactant or mutual solvent, or both.

87. The spent completion fluid of claim 86, wherein said surfactant or mutual solvent is capable of suspending or emulsifying oil-based components in an oil-based mud or synthetic based mud.

88. The method of claim 76, wherein said completion fluid further comprises at least one surfactant or mutual solvent.

89. The method of claim 88, wherein said surfactant or mutual solvent is capable of suspending or emulsifying oil-based components in an oil-based mud or synthetic based mud.

90. The completion fluid of claim 84, wherein said surfactant or mutual solvent comprises an acrylic acid copolymer, a hydroxyethyletbylene urea, polymers thereof, or combinations thereof.

91. The completion fluid of claim 84, wherein said surfactant or mutual solvent comprises at least one sodium or ammonium salt of acrylic acid copolymer, optionally containing one or more alkylene oxide adducts.

92. The spent completion fluid of claim 86, wherein said stufactant or mutual solvent comprises an acrylic acid copolymer, a hydroxyethylethylene urea, polymers thereof, or combinations thereof.

93. The spent completion fluid of claim 86, wherein said surfactant or mutual solvent comprises at least one sodium or ammonium salt of acrylic acid copolymer, optionally containing alkylene oxide adducts.

94. The method of claim 88, wherein said surfactant or mutual solvent comprises an acrylic acid copolymer, a hydroxyethylethylene urea, polymers thereof, or combinations thereof.

95. The method of claim 88, wherein said surfactant or mutual solvent comprises at least one sodium or ammonium salt of acrylic acid copolymer, optionally containing one or more alkylene oxide adducts.

96. A drilling fluid or mud comprising (a) at least one alkali metal tungstate and (b) at least one alkali metal formate, and (c) a hydrocarbon-based fluid or synthetic mud fluid, or a solid weighting agent, or a sealing or fluid loss agent, or a filtration control agent or organoclay, or any combination thereof, wherein said alkali metal tungstate comprises cesium tungstate, potassium tungstate, or both.

97. The drilling fluid of claim 96, further comprising at least one emulsifier.

98. The drilling fluid of claim 96, wherein at least one hydrocarbon-based fluid or synthetic mud fluid is present.

99. The drilling fluid of claim 96, wherein said drilling fluid further comprises at least one acid.

100. The drilling fluid of claim 96, wherein at least one fluid loss agent is present.

101. The drilling fluid of claim 97, wherein said emulsifier comprises a dimer trimer acid, imadazoline, tall oil, or combinations thereof.

102. The drilling fluid of claim 98, wherein said hydrocarbon-based fluid comprises diesel oil.

103. The drilling fluid of claim 98, wherein said hydrocarbon-based fluid comprises at least one synthetic oil.

104. The drilling fluid of claim 99, wherein said acid is formic acid or an acid derivative thereof.

105. The drilling fluid of claim 96, wherein said alkali metal tungstate is less than fully saturated in said drilling fluid.

106. A method to drill a well comprising drilling said well in the presence of the drilling fluid of claim 96.

107. A method to drill a well comprising drilling said well in the presence of the a drilling fluid, wherein said drilling fluid comprises at least one alkali metal tungstate and at least one alkali metal formate, wherein said alkali metal tungstate comprises cesium tungstate, potassium tungstate, or both.

108. A drilling fluid or mud made by mixing at least one alkali metal tungstate, at least one emulsifier, at least one alkali metal formate, and at least one sealing or fluid loss agent.

109. A drilling fluid or mud made by mixing at least one alkali metal tungstate, at least one emulsifier, at least one hydrocarbon-based fluid or synthetic mud fluid, and at least one alkali metal formate.

110. The completion fluid of claim 84, wherein said surfactant or mutual solvent comprises a mixture of a ethylene oxide/propylene oxide adduct of an acrylate copolymer, polymeric hydroxyethylethylene urea, monobutyl ethylene glycol, ethoxylated long chain alcohols, sulfated long chain alcohols, or combinations thereof.

111. The completion fluid of claim 43, wherein said alkali metal tungstate is present in an amount of from about 3 M to about 12 M.

112. The spent completion fluid of claim 86, wherein said surfactant or mutual solvent comprises a mixture of an ethylene oxide/propylene oxide adduct of an acrylate copolymer and polymeric hydroxyethylerhylene urea.

113. An aqueous-based composition comprising at least one alkali metal tungstate, at least one chelating agent, and at least one alkali metal formate, wherein said at least one alkali metal tungstate is cesium tungstate, or said at least one alkali metal formate is cesium formate, or both.

114. A drilling fluid or mud comprising at least one alkali metal tungstate and at least one alkali metal formate, and further comprising at least one emulsifier, and at least one sealing or fluid loss agent.

* * * * *

UNITED STATES PATENT AND TRADEMARK OFFICE
CERTIFICATE OF CORRECTION

| | |
|---|---|
| PATENT NO. | : 7,273,832 B2 |
| APPLICATION NO. | : 10/216048 |
| DATED | : September 25, 2007 |
| INVENTOR(S) | : William J. Benton and Neal F. Magri |

It is certified that error appears in the above-identified patent and that said Letters Patent is hereby corrected as shown below:

At column 19, line 61, change "hydroxyethyletbylene" to --hydroxyethylethylene--.
At column 20, line 2, change "stufactant" to --surfactant--.
At column 21, line 7, change "hydroxyethylerhylene" to --hydroxyethylethylene--.

Signed and Sealed this

Thirtieth Day of December, 2008

JON W. DUDAS
*Director of the United States Patent and Trademark Office*